United States Patent [19]
Krismanth et al.

[11] Patent Number: 5,415,274
[45] Date of Patent: May 16, 1995

[54] TANDEM BELT CONVEYOR SYSTEM

[75] Inventors: Kenneth A. Krismanth, Strongsville; Denis J. Osowski, Maple Hts., both of Ohio

[73] Assignee: FECO Engineered Systems, Inc., Cleveland, Ohio

[21] Appl. No.: 148,468

[22] Filed: Nov. 5, 1993

Related U.S. Application Data

[63] Continuation of Ser. No. 861,194, Mar. 31, 1992, Pat. No. 5,261,527.

[51] Int. Cl.⁶ .............................................. B65G 23/14
[52] U.S. Cl. .................................. 198/833; 198/841
[58] Field of Search ............... 198/833, 832, 841, 835, 198/838, 837, 836.1

[56] References Cited

U.S. PATENT DOCUMENTS

| | | | |
|---|---|---|---|
| 1,518,989 | 9/1926 | Saholt | 198/841 X |
| 1,699,764 | 1/1929 | Solem | 198/837 X |
| 1,706,905 | 3/1929 | Stockley et al. | 198/833 X |
| 2,010,917 | 8/1935 | Du Pont | 198/833 X |
| 3,268,065 | 8/1966 | Thomson | 198/833 |
| 3,416,645 | 12/1968 | Jones | 198/833 |
| 3,444,390 | 11/1976 | Peterson, Jr. et al. | 198/833 |
| 3,621,986 | 11/1971 | Webb et al. | 198/841 X |
| 3,889,803 | 6/1975 | White | 198/833 |
| 4,574,443 | 3/1986 | Green | 198/833 |
| 4,589,845 | 5/1986 | Nadharo et al. | 198/841 X |

FOREIGN PATENT DOCUMENTS

| | | | |
|---|---|---|---|
| 2514572 | 10/1976 | Germany | 198/833 |
| 2636604 | 2/1978 | Germany | 198/833 |
| 0040104 | 3/1980 | Japan | 198/838 |

OTHER PUBLICATIONS

Ashworth Bros., Inc. Bulletin No. IC-75 Entitled: "Installation and Operating Recommendations for Friction Driven Metal Belts".
Ashworth Bros., Inc., Bulletin No. CD76 Entitled: "Chain Driven Belts".

*Primary Examiner*—James R. Bidwell
*Attorney, Agent, or Firm*—Renner, Otto, Boisselle & Sklar

[57] ABSTRACT

A tandem belt conveyor system comprising an endless primary conveyor belt, an endless support conveyor belt and a synchronous drive for synchronously driving the primary and support conveyor belts. The primary conveyor belt is a flat wire belt having a carrier flight for transport of articles and a return flight. The support conveyor belt has a support flight for supporting the carrier flight of the primary conveyor belt, and a return flight. The support conveyor belt includes a pair of chains interconnected by transverse cross bars for supporting the primary conveyor belt. The synchronous drive includes an AC motor for driving one of the belts, a DC motor for driving the other belt, and a DC motor controller for controlling the AC and DC motors in master-slave relationship to synchronize the speeds of the belts. The tandem belt conveyor system of the invention avoids the production of metal fines in heating or cooling chambers through which articles such as cans are passed by the conveyor system for curing or other processing of coatings thereon.

13 Claims, 4 Drawing Sheets

TANDEM BELT CONVEYOR SYSTEM

This is a continuation of application Ser. No. 07/861,194 filed on Mar. 31, 1992, now U.S. Pat. No. 5,261,527.

The invention herein described relates generally to belt conveyor systems and more particularly to tandem belt conveyor systems for mass transport of articles through ovens or the like.

BACKGROUND

Heretofore belt conveyors have been used for mass transport of articles such as cans through ovens such as for the purpose of drying or curing coatings applied to the cans. Known conveyor belts include spiral woven belts, rod reinforced belts, chain driven belts and flat wire belts. Being continuous, the belts have a carrier flight for transport of product and a return flight. Stationary type or roller type supports may be provided for the carrier flight to support the weight of the articles being conveyed as well as the weight of the carrier flight of the belt.

In the past a problem arose when using a stationary support in an oven for curing coatings on cans. The dragging of a metal conveyor belt, such as a flat wire belt, over the stationary support, such as slide bars, produced metal and ceramic fines that were objectionable to some users of these belt conveyors. One solution to this problem was obtained by using a roller bed to support the flat wire belt. This solution, however, was viewed by some as undesirable because of unsupported areas between rolls and wear due to belt abrasion.

Also known are tandem belt conveyors which use a primary conveyor belt and a support conveyor belt. A spiral woven belt has been used as the primary conveyor belt and a chain driven cross bar conveyor belt, including a pair of chains interconnected by transverse cross bars of circular cross-section, has been used as the support conveyor belt. The two conveyor belts were mechanically linked whereby one conveyor belt was driven by the other for synchronous operation. This design, however, has several drawbacks including belt tracking and stretching problems. The conveyor belts may also lose synchronism as they wear and this may result in increased wear and production of metal fines because of the relative movement that arises from the belts moving at different speeds.

Still another known conveyor design uses a composite conveyor belt including a spiral woven belt and a chain driven cross bar conveyor belt. The cross bar conveyor belt includes a pair of chains interconnected by transverse cross bars of rectangular cross-section. In this design hold down clips are used to lock the spiral woven belt to the cross bars thereby to form a composite belt that is driven by a single drive.

SUMMARY OF THE INVENTION

The present invention provides an improved tandem belt conveyor system which overcomes drawbacks associated with prior known belt conveyor systems. The system of the present invention avoids production of metal fines and provides a smooth running, flat surface for transfer of articles and in particular can bodies standing on end.

A tandem belt conveyor system according to the invention comprises an endless primary conveyor and an endless support conveyor. Preferably, the primary conveyor is a flat wire belt having a carder flight for transport of articles and a return flight. The endless support conveyor has a support flight for supporting the carrier flight of the primary conveyor, and a return flight. The support conveyor belt includes a pair of chains interconnected by transverse cross bars preferably of rectangular cross-section for supporting the primary conveyor belt.

Provision is made for synchronously driving the primary and support conveyor belts. Preferably one of the belts is driven by an AC motor and the other by a DC motor, with electrical control means being provided for controlling the AC and DC motors in master-slave relationship to synchronize the linear speeds of the belts. The result is a positive drive arrangement with essentially no slippage between the belts thereby avoiding the production of metal fines that could otherwise result from prior art friction drive or mechanically synchronized drive arrangements.

A preferred application for the tandem belt conveyor system is in an article processing system comprising a processing chamber, particularly an oven chamber for baking or otherwise heating articles being passed therethrough. The carrier flight of the primary conveyor belt extends through the oven chamber as does the support flight of the support conveyor belt. The chains of the support conveyor belt include oversized rollers which ride on rails extending through the oven chamber. Accordingly, there is provided an arrangement which avoids the above mentioned problem of metal or ceramic fines being produced in a thermal processing system.

Further in accordance with the invention, an article processing system may comprise first and second processing chambers and a tandem belt conveyor mounted with respect to the processing chambers for transporting articles sequentially through the processing chambers. The tandem belt conveyor includes an endless primary conveyor belt having a carrier flight for transport of articles sequentially through the processing chambers, and a return flight. More particularly, the carrier flight of the primary conveyor belt has a first portion extending through the first processing chamber and a second portion extending through the second processing chamber. The first and second portions of the primary conveyor belt are supported by respective support flights of first and second support conveyor belts that are synchronously driven with the primary conveyor belt. Preferably the return flights of the first and second support belts pass through the first and second processing chambers, as is advantageous when the processing chambers are maintained at different temperatures such as one at a temperature above ambient conditions and the other below, for example.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
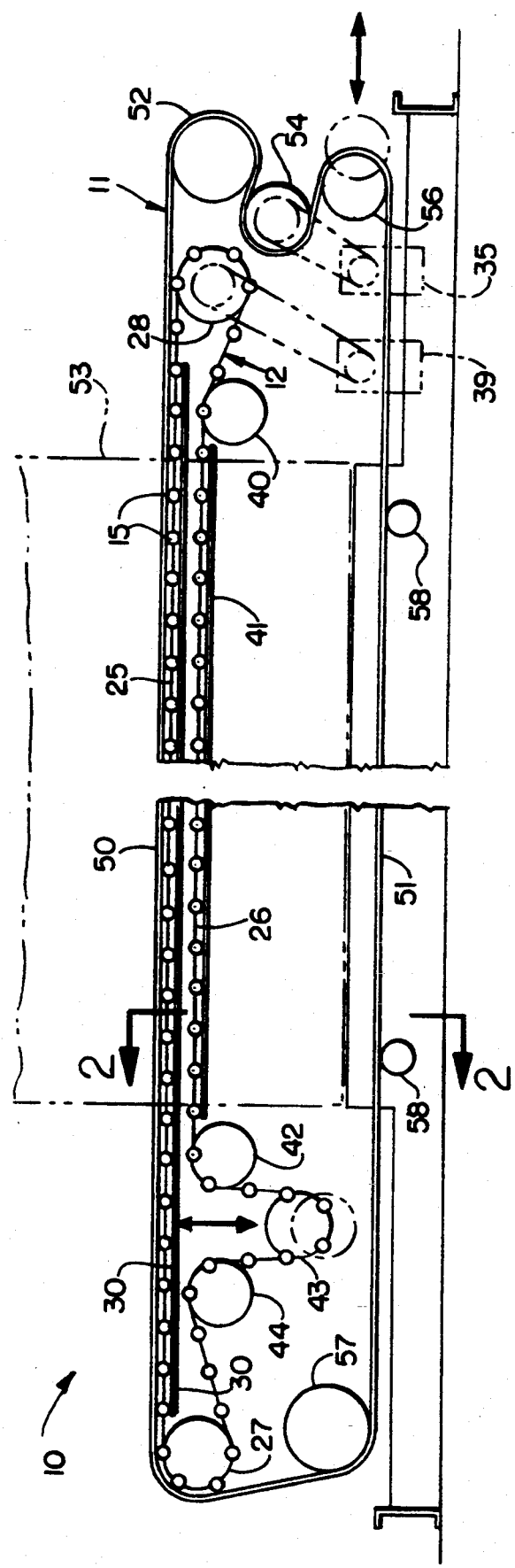
FIG. 1 is a fragmentary elevational view of a tandem belt conveyor according to the invention.
Figure 2:
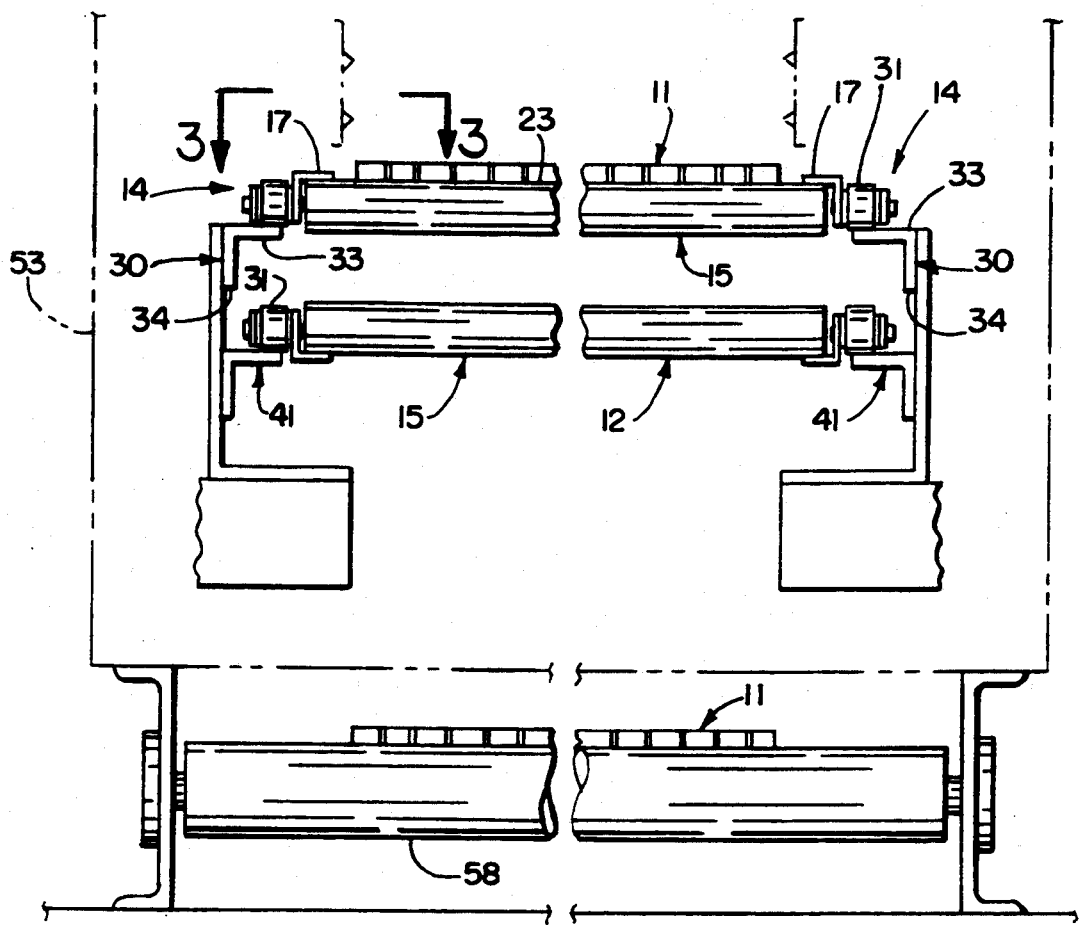
FIG. 2 is a fragmentary cross-sectional view of the tandem belt conveyor of FIG. 1, taken along the line 2—2 of FIG. 1.

Referring now in detail to the drawings and initially to FIGS. 1 and 2, a tandem belt conveyor system according to the invention is indicated generally at 10. The tandem belt conveyor system 10 comprises a primary conveyor belt 11 and a support conveyor belt 12. The primary conveyor belt is a flat wire belt with an exemplary belt being an Ashworth A1 flat wire belt having a 1"×1" mesh. The present invention is primarily directed to systems wherein the primary conveyor belt is at least 2 feet wide and more particularly about 6-12 feet wide.

Figure 3:
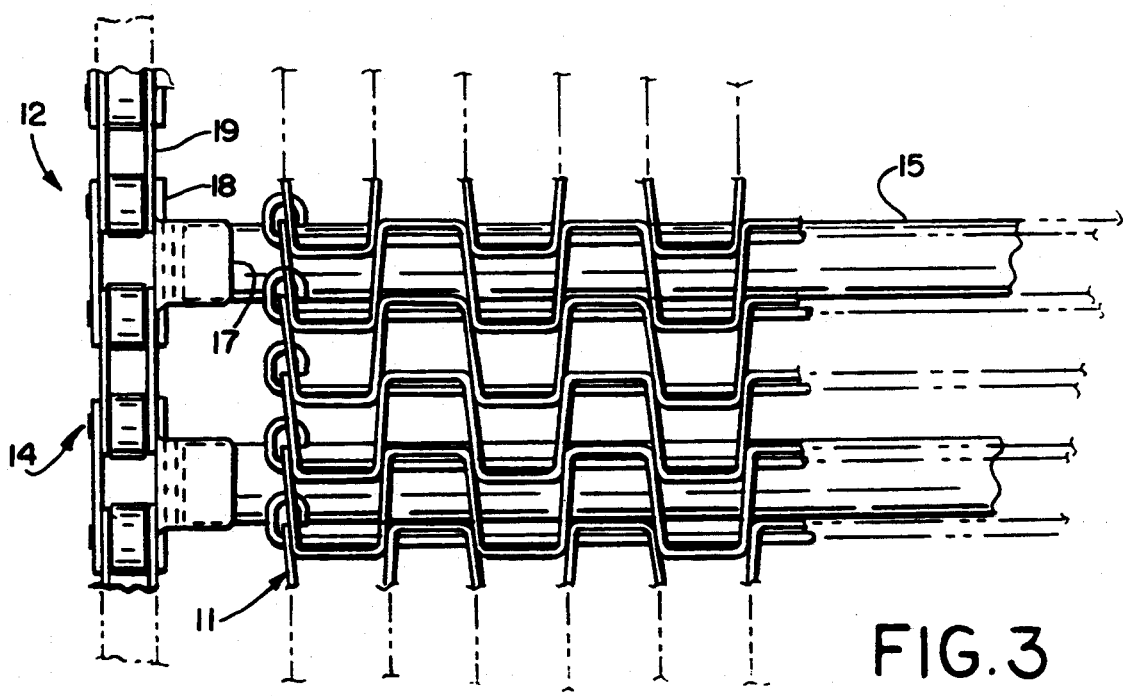
FIG. 3 is a fragmentary plan view of the tandem belt conveyor of FIG. 1, taken from the line 3—3 of FIG. 2.

As seen in FIGS. 2 and 3, the support conveyor belt 12 is a chain driven cross bar conveyor belt including a pair of oversized roller chains 14 that are interconnected by cross bars 15. The cross bars preferably are tubes having a square or rectangular cross-section rather than a circular cross-section. The cross bars 15 preferably are parallel and uniformly spaced along the roller chains. In the illustrated embodiment the cross bars are spaced apart by a distance twice the pitch of the roller chain and are about 1 inch square.

The roller chains preferably are of a type equipped with attachment flanges 17 on the outer links 18 at one side of the chain. The attachment flanges, also referred to in the art as A1 attachments, are perpendicular to the links and, as seen in FIGS. 2 and 3, extend from the top edge of the outer chain links 18 and hence every other link, there being inner links 19 alternating with the outer links 18 at each side of the chain as is conventional. The attachment flanges 17 provide convenient attachment points for the cross bars 15 as by welding to the end of the cross bar. When the cross bars 15 are attached to the roller chains 14 in this manner, an upper flat surface 23 of the cross bars is parallel to the longitudinal axis of the link 18 of the roller chain to which it is attached. Consequently, the top flat surface 23 of each cross bar 15 will be parallel or tangential to the direction of travel of the support conveyor belt 12 at the point of attachment.

As seen in FIG. 1, the support conveyor belt 12, which is endless, is trained or guided around various wheels and has a support flight 25 and a return flight 26. The support flight 25 extends between a tail wheel 27 at the feed end of the conveyor (at the left in FIG. 1) and a drive wheel 28 at the discharge end of the conveyor (to the right in FIG. 1). Between the tail and drive wheels the support flight 25 of the support conveyor belt is supported and guided by parallel rails 30 on which the rollers 31 of the roller chains 14 ride as seen in FIG. 2. The support rails 30, which extend between the head and drive wheels at opposite sides of the support conveyor, may be L-shaped as shown. The upper leg 33 of the rail extends horizontally and provides a rail surface on which the chain rollers roll as the support conveyor traverses the support flight. The other leg 34 of each rail is mounted to suitable support structure.

The support conveyor belt 12 is positively driven by the drive wheel 28 which includes a pair of drive sprockets respectively in mesh with the roller chains 14. The drive sprockets are mounted to a drive shaft which is driven by a support conveyor belt drive motor 39. The drive shaft also has mounted thereto a plurality of transversely spaced apart support discs (not shown) which support the support conveyor belt intermediate the drive sprockets as the support conveyor belt travels around the drive wheel. The support discs have a cylindrical, radially outer surface of a diameter equal twice the distance between the bottom side of the cross bars and the axis of the drive shaft, and the discs may be transversely spaced apart, for example, by about 24 inches for a 96 inch wide support conveyor belt.

In its return flight 26, the support conveyor belt 12 passes from the drive wheel 28 to an idler wheel 40. The idler wheel 40 is positioned at the entry end of a pair of laterally spaced apart parallel rails 41 which extend horizontally from the idler wheel 40 to an idler wheel 42 at the feed end of the conveyor belt. As seen in FIG. 2, the rails 41 are essentially identical to the rails 30 and serve to support the support conveyor over a major portion of its return flight.

At the feed end of the conveyor the support conveyor belt 12 passes from the idler wheel 42 to the tail wheel 27 after first passing over a take-up wheel 43 and another idler wheel 44. The take-up wheel 43 may be vertically adjusted to control the tension of the support conveyor belt. The tail wheel 27 includes a pair of sprockets in mesh with the roller chains for controlling tracking of the support conveyor as it travels around the tail wheel. The sprockets are mounted to a tail shaft along with a plurality of support discs. The support discs are interposed between the sprockets and laterally spaced apart to support the support conveyor belt across its full width as it travels around the tail wheel 27, as in the same manner that the support conveyor belt is supported as it travels around the drive wheel 28.

The flat wire belt 11, constituting the primary conveyor belt, has a carrier flight 50 and a return flight 51. The carrier flight 50 extends between the tail wheel 27 at the feed end of the conveyor and a head wheel 52 at the discharge end of the conveyor. Between the tail wheel 27 and the drive wheel 52 the carrier flight of the flat wire belt is supported atop the support flight of the support conveyor belt 12. More particularly, the flat wire belt is supported on the top flat surfaces 23 of the cross bars 15 between the attachment flanges 19 as seen in FIGS. 1-3. The attachment flanges project slightly above the top surfaces 23 of the cross bars to form side walls or abutments which may function to restrict lateral shifting movement of the flat wire belt relative to the support conveyor belt over the full extent of their overlap.

As seen in FIG. 1 the support flight 25 of the support conveyor belt 12 supports the carrier flight 50 of the flat wire belt 11 through an intermediate portion of the conveyor which may pass through a processing chamber, more particularly a thermal processing chamber, and still more particularly an oven 53 or other confined area in which articles carried on the flat wire belt are heated or otherwise processed. By way of specific example, cans may be conveyed by the flat wire belt through the oven in which coatings applied to the cans are cured.

The support flight 25 of the support conveyor belt 12 preferably supports the carrier flight 50 of the flat wire belt 11 over substantially its entire length. As seen in FIG. 1, the flat wire belt is trained around the tail wheel 27 along with the support conveyor belt, with the support conveyor belt interposed between the flat wire belt and the tail wheel 27. At the other or discharge end of the conveyor the carrier flight of the flat wire belt extends a short distance beyond the support flight of the support conveyor belt and to the head wheel 52. From the head wheel 52 the flat wire belt passes over a drive wheel 54. The flat wire belt is positively driven by the drive wheel which may include a conventional arrangement of drive sprockets in mesh with the flat wire belt at transversely spaced apart locations across the width of the flat wire belt. The drive sprocket is mounted to a drive shaft which is driven by a primary conveyor belt drive motor 55.

In its return flight 51 the flat wire belt passes from the drive wheel 52 to a take-up wheel 56 which may be adjusted horizontally to control the tension of the flat wire belt. From the take-up wheel the flat wire belt extends horizontally to an idler wheel 57 at the feed end of the conveyor. A plurality of longitudinally spaced-apart, transversely extending support rollers 58 are provided to support the flat wire belt as it travels from the take-up wheel 56 to the idler wheel 57. From the idler wheel the flat wire belt extends generally upwardly to the tail wheel 27. In conventional manner the various idler wheels comprise a plurality of idler sprockets mounted to an idler shaft in transversely spaced-apart relationship to provide support for the full belt width and to ensure proper tracking of the flat wire belt.

As seen in FIGS. 1 and 2, the support conveyor belt 12 has a high pass return for passage through the oven 53 on its return flight. The support conveyor belt usually will have a thermal mass significantly higher than that of the flat wire belt and thus it is more desirable to maintain the support conveyor belt at or close to the operating temperature of the processing chamber for improved performance and energy efficiency.

Figure 4:
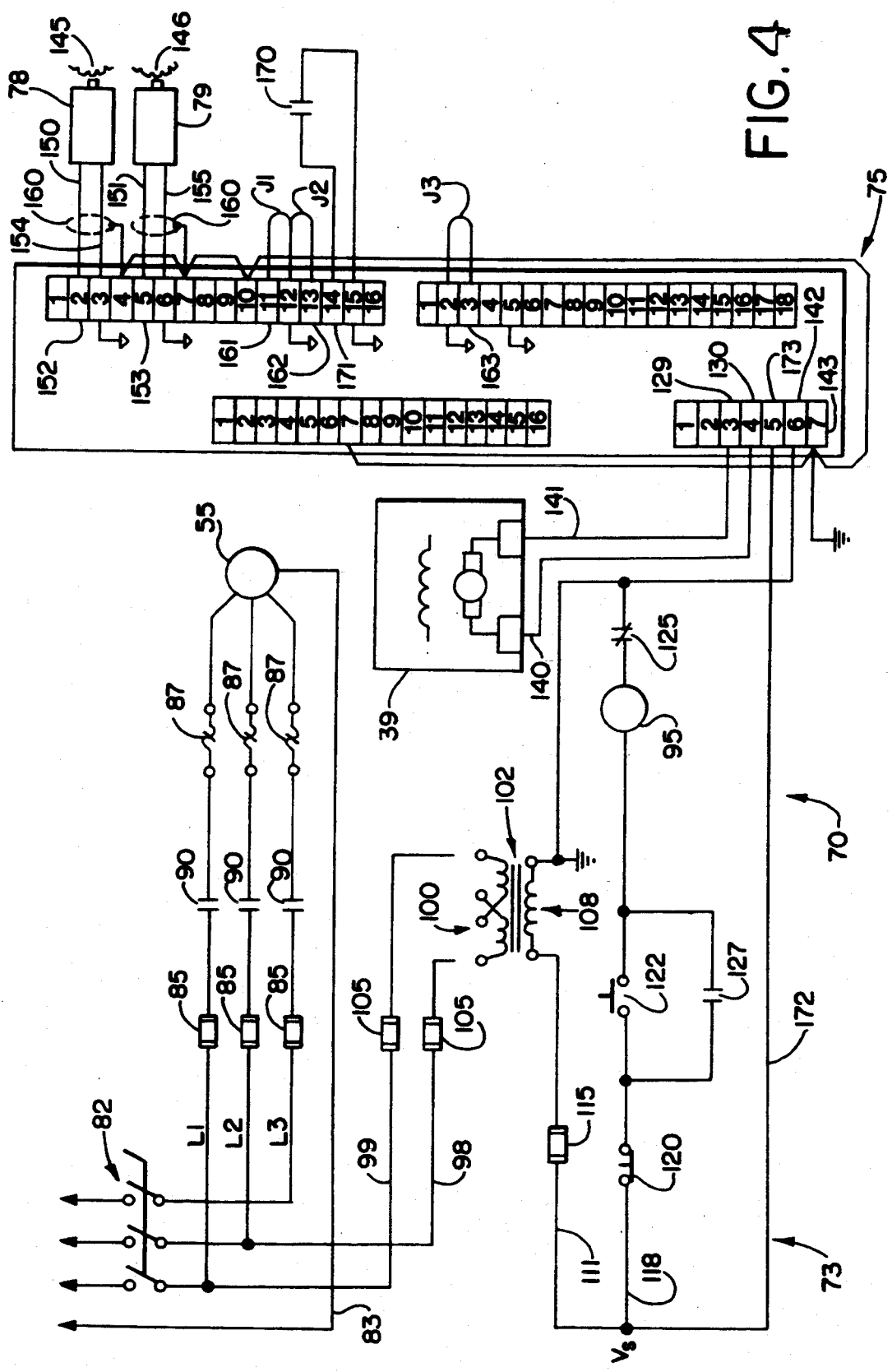
FIG. 4 is a schematic diagram of the control circuitry for the primary and secondary conveyor drive motors according to the invention.

Referring now to FIG. 4, conveyor control circuitry is indicated generally at 70. The control circuitry provides for synchronous operation of the primary and support conveyor drive motors. The circuitry maintains uniform speed of the primary and support belts notwithstanding wear, stretching or other factors that may affect belt speed during use.

In the illustrated preferred circuitry, the primary conveyor belt drive motor 55 is an AC motor such as, for example, a three-phase induction motor, and the support conveyor belt drive motor 39 is a DC motor having a permanent magnet field. Alternatively, the support conveyor belt drive motor could be the AC motor and the primary conveyor belt drive motor could be the DC motor.

The conveyor control circuit 70 includes a starting circuit 73 for starting and stopping the primary conveyor belt drive motor 55, and a DC motor controller 75 for controlling operation of the support conveyor belt drive motor 39 in master-slave relation to the primary conveyor belt drive motor. A magnetic pickup 78 provides an external reference frequency signal input to the DC motor controller 75 which is proportional to the speed of the primary conveyor belt drive motor 55 and hence the primary conveyor belt. In addition, a second magnetic pickup 79 provides as an input to the DC motor controller 75 a feedback frequency signal proportional to the speed of support conveyor belt drive motor 39 and hence the support conveyor belt. As is further described below, the DC motor controller 75 controls the speed of the support conveyer belt drive motor 39 relative to the primary conveyor belt drive motor 55 and, as a result, synchronizes the speed of the respective belts.

Three-phase power is supplied to the primary conveyor belt drive motor 55 via lines L1–L3. A three terminal on/off switch 82 serves as the main disconnect between the power supply (not shown) and the primary conveyor belt drive motor 55, and a ground line 83 is connected between the motor 55 and ground. Each phase in the primary belt drive motor 55 includes current protection in the form of a fuse 85 and a thermal overload device 87. In the event of an overload, the overload device 87 melts and interrupts the power to the respective winding.

Each line L1–L3 to the primary conveyor belt drive motor 55 includes a normally open contact 90 which is used to connect the line voltage directly to the respective winding in each phase. The starting circuit 73 includes a motor starter 95 which, when energized, closes each contact 90 such that the primary conveyor belt drive motor 55 will start and run. Power is provided to the starting circuit 73 itself by way of lines 98 and 99 which are connected, respectively, to the power lines L1 and L2. The power lines L1 and L2 supply power to the primary winding(s) 100 of a control transformer 102 used to scale the supply voltage to the starting circuit 73. In-line fuses 105 provide current protection to the control transformer 102. The exact connection between lines 98, 99 and the primary windings 100 is dependent on the line voltage on lines L1 and L2, the transformer ratio, etc., as will be appreciated.

The control transformer secondary winding 108 is connected at one end to ground and at the other end to line 111. As a result, a scaled supply voltage $V_s$ is present on line 111 and provides the supply voltage to the starting circuit 73. Line 111 includes a fuse 115 which serves to provide current protection in the starting circuit 73.

The starting circuit 73 includes line 118 which is connected between line 111 and ground and includes a series connected conveyor stop pushbutton 120, a conveyor start pushbutton 122, the aforementioned motor starter 95, and a normally closed overload contact 125. An auxiliary contactor 127 is connected in parallel across the conveyor start pushbutton 122. The conveyor stop pushbutton 120 is normally closed, and the conveyor start pushbutton 122 is normally open, as is illustrated.

When starting the primary conveyor belt drive motor 55, the main disconnect switch 82 is closed and the conveyor start pushbutton 122 is momentarily depressed. The potential $V_s$ on line 111 energizes the motor starter 95 which in turn closes the respective contacts 90, thereby resulting in the line voltages being applied to the motor 55. In addition, the motor starter 95 closes the auxiliary contactor 127 such that when the pushbutton 122 is released, the motor starter 95 continues to be energized, and the motor 55 continues to run. In the event of a motor starter overload condition, the contact 125 will open, and the motor starter 95 will become de-energized. As a result, the contacts 90 and 127 will open and interrupt power to motor 55. Alternatively, when the conveyor stop pushbutton 120 is depressed, the motor starter 95 is de-energized and, again, power to the motor 55 is interrupted.

The DC motor controller 75 can be any of several integrated controllers such as, for example, the commercially available Fenner M-Drive, Part No. 3200-1673. Alternatively, the DC motor controller may consist of an equivalent circuit of discrete components. The armature winding of the support conveyor belt drive motor 39 is connected to the A1 and A2 terminals 129 and 130 of the DC motor controller 75 by way of lines 140 and 141. By varying the potential across the A1 and A2 terminals 129 and 130, the DC motor controller 75 controls the speed of the motor 39, as is known. The NEUT./L2 and CHASSIS GND terminals 142 and 143 of the DC motor controller 75 are coupled to ground, as is illustrated.

The magnetic pickups 78 and 79 in the preferred embodiment are located adjacent to gears 145 and 146 in the gear trains of the belt drive motors 55 and 39. The magnetic pickups 78 and 79 sense the rotation of the teeth on the respective gears 145 and 146 and generate electrical signals on respective lines 150 and 151 consisting of a series of pulses whose frequency is proportional to the rotational speed of the respective gears. Line 150 is connected to the external reference frequency input terminal 152 of the DC motor controller 75, and line 151 is coupled to the feedback frequency input terminal 153. The magnetic pickups are grounded by lines 154 and 155, respectively, which are connected to ground by way of the DC motor controller 75, as shown. A separate grounding shield 160 is included around the lines connected to the magnetic pickups to protect against undesirable interference.

The R-STOP and RUN terminals 161 and 162 of the DC motor controller 75 are jumpered via jumpers J1 and J2 to ground such that the motor 39 may be operated continuously in a forward direction. Jumper J3 couples the primary mode/secondary mode terminal 163 to ground in order that the DC motor controller operates in the secondary mode with a follower scaling format. An auxiliary contact 170 is connected across the F-STOP terminal 171 and provides start and stop control of the support conveyor belt drive motor 39. The contact 170 is activated by the motor starter 95 in the same manner and at the same time as are contacts 90 and 127. The supply voltage to the DC motor controller 75 is provided by line 172 which couples the supply potential $V_s$ on line 111 to the power supply terminal 173 of the controller.

When the motor starter 95 is energized, the contact 170 pulls the potential at the F-STOP terminal to ground, thereby causing a potential to be applied to the armature windings in the motor 39 via terminals A1 and A2. As the motor 39 rotates, the feedback frequency input signal on line 151 is detected by the DC motor controller 75 and is compared to the external reference frequency input on line 150. In order that the respective conveyor belts will travel at matched speeds, the DC motor controller 75 adjusts the speed of the support conveyor belt drive motor 39 so as to achieve and maintain a predetermined frequency ratio between the signal on line 150 and the signal on line 151. The predetermined frequency ratio is a programmed function of the DC motor controller.

It will be appreciated that the motors 39 and 55 may or may not rotate at identical speeds in order for the belt speeds to be synchronized. Depending upon the gearing utilized with the respective conveyor belts and, for example, the diameter of the respective drive wheels 28 and 54, the motors 39 and 55 may, in fact, run at substantially different speeds. The exact ratio setpoint invoked by the DC motor controller may be calculated based on such physical characteristics, or, alternatively, the ratio setpoint of the DC motor controller may be found empirically by adjusting the ratio setpoint until the conveyor belt speeds are synchronized.

Figure 5:
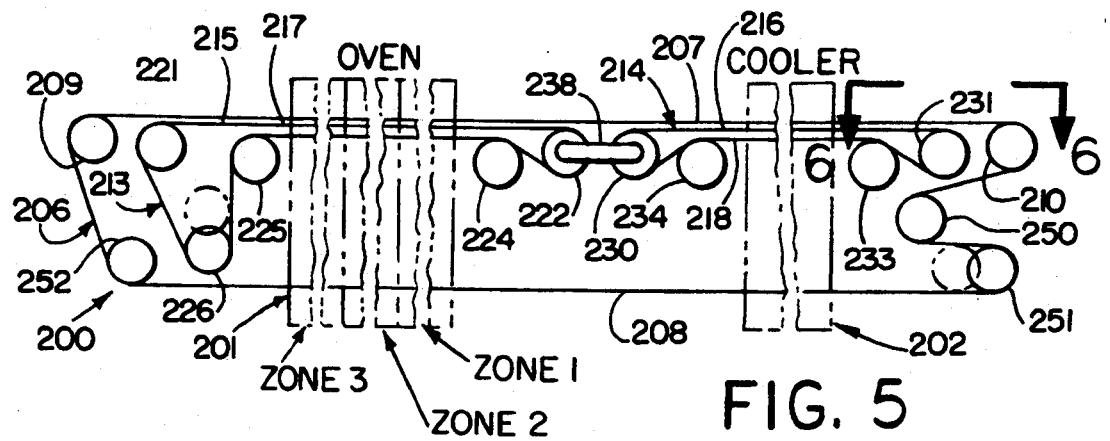
FIG. 5 is a schematic elevational view of another embodiment of tandem belt conveyor according to the invention.

Referring now to FIG. 5, another embodiment of tandem belt conveyor system according to the invention is indicated generally at 200. The tandem belt conveyor system 200 is particularly useful for transporting articles through multiple processing chambers maintained at different temperatures, such as through an oven 201 and then through a cooler 202 for cooling the articles to a lower temperature for subsequent processing and/or handling. As illustrated in FIG. 5, the oven 201, or other processing chamber, may have multiple zones in which the articles are subjected to different temperatures and/or processing conditions.

Like the tandem belt conveyor system 10 of FIG. 1, the tandem belt conveyor system 200 comprises a primary conveyor belt 206 having a carrier flight 207 and a return flight 208. The carrier flight 207 extends from a tail wheel 209 at the feed end of the conveyor to a head wheel 210 at the discharge end of the conveyor, and hence through both processing chambers 201 and 202.

Unlike the tandem belt conveyor system 10 of FIG. 1, the carder flight 207 of the primary conveyor belt 206 is supported atop the support flight of two support conveyor belts 213 and 214. The support conveyor belts 213 and 214 are respectively associated with the processing chambers 201 and 202. Accordingly, the support conveyor belt 213 has a support flight 215 which supports the carrier flight 207 of the primary conveyor belt 206 over the portion thereof which extends through the oven 201, whereas the support conveyor belt 214 has a support flight 216 which supports the carrier flight of the primary conveyor belt over the portion thereof which extends through the cooler 202. Moreover, the support conveyor belts 213 and 214 have respective high pass return flights 217 and 218 which pass through the oven 201 and cooler 206, respectively. As a result, the support conveyor belts 213 and 214 are maintained at oven temperature and cooler temperature, respectively, thereby to minimize energy losses. Also, maintaining the upstream support conveyor belt 213 at approximately oven temperature will assist in bringing the flat wire belt 206 up to oven temperature as heat will be conducted from the support conveyor belt 213 to the primary conveyor belt 206. Similarly, maintaining the downstream conveyor belt 214 at approximately the temperature of the cooler 202 will assist in cooling the primary conveyor belt 206 prior to entry into the cooler.

Although the embodiment of FIG. 5 includes two processing chambers and respective support conveyor belts, it should be understood that the split belt design of FIG. 5 may generally be utilized with systems including two or more processing chambers by using two or more support conveyor belts, generally one support conveyor belt for each processing chamber to provide for temperature isolation and/or to accommodate other process variations among multiple processing chambers.

Each support conveyor belt 213, 214 preferably is a chain driven cross bar conveyor belt like the support conveyor belt 12 described above and illustrated in FIGS. 2 and 3. The support flight 215 of the upstream support conveyor belt 213 extends between a tail wheel 221 at the feed end of the conveyor (at the left in FIG. 5) and a drive wheel 222 located between the oven 201 and cooler 202. Between the tail and drive wheels 221 and 222 the support flight 215 of the support conveyor belt 213 is supported and guided by parallel rails in the same manner described above with respect to the support conveyor belt 12 in the FIG. 1 embodiment.

In its return flight 217, the support conveyor belt 213 passes from the drive wheel 222 to an idler wheel 224. From the idler wheel 224, the support conveyor belt passes back through the oven 201 and is supported by parallel rails in the same manner as described above with respect to the support conveyor belt 12. At the forward end of the oven the support conveyor belt passes over another idler wheel 225 and then to the tail wheel 221 after passing over a take-up wheel 226.

The support flight 216 of the downstream support conveyor belt 214 extends from a tail wheel 230 located between the oven 201 and the cooler 202 to a drive wheel 231 at the discharge end of the conveyor (to the right in FIG. 5). Between the tail and drive wheels 230 and 231 the support flight 216 of the support conveyor belt 214 is supported and guided by parallel rails in the same manner as described above with respect to the support conveyor belt 12. In its return flight, the support conveyor belt passes from the drive wheel to an idler wheel 233 and then through the cooler to another idler wheel 234. Between the idler wheels 233 and 234 the support conveyor belt is supported and guided by rails in the same manner as described above with respect to the support conveyor belt 12. From the idler wheel 234, the support conveyor belt passes to the tail wheel 230. Although not illustrated, a take-up wheel or other mechanism may be provided to control the tension of the support conveyor belt 214.

Figure 6:
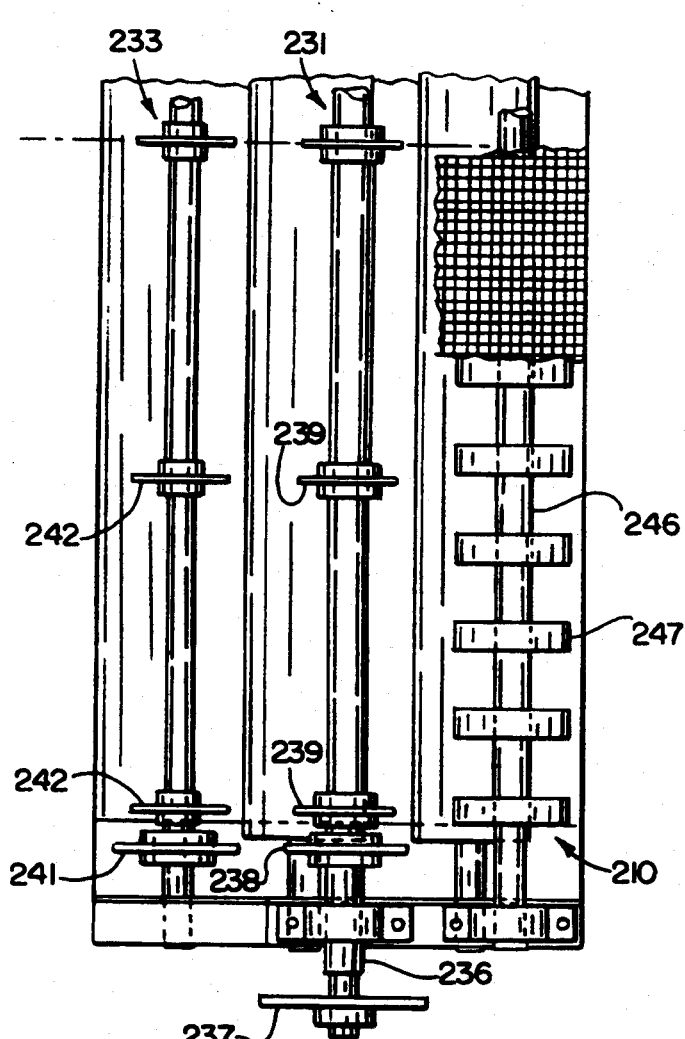
FIG. 6 is a partial top plan view of the tandem belt conveyor of FIG. 5 looking from the line 6—6 of FIG. 5.

As seen in FIG. 6, the drive wheel 231 has a drive shaft 236 which has mounted at one end thereof a sprocket 237 for connection to a drive motor by way of a drive chain or other suitable means. The drive shaft 236 also has mounted thereon a pair of drive sprockets 238 (only one shown) which mesh with the roller chains of the support conveyor belt 214. The drive shaft 236 further has mounted thereto a plurality of transversely spaced apart support discs 239 which support the support conveyor belt 214 intermediate the drive sprockets 238 as the support conveyor belt travels around the drive wheel. In similar manner, the idler wheel 233, as well as the other wheels 221, 222, 224, 225, 226, 230 and 234, may have mounted thereon a pair of sprockets respectively in mesh with the roller chains of the respective support conveyor belt and a plurality of transversely spaced apart support discs which support the support conveyor belt intermediate the drive sprockets.

While the downstream support conveyor belt 214 is driven by a drive motor, the upstream support conveyor belt is driven by the downstream support conveyor belt by a drive chain schematically illustrated at 238 in FIG. 5, or by other suitable means, for synchronous driving of the two support conveyor belts 213 and 214. The wheels 222 and 230 may have sprockets mounted to the ends thereof in the same manner that the sprocket 237 is mounted to the end of the drive shaft 236, and the drive chain 238 may be trained around the two sprockets which may be the same size as the drive sprocket 237. Accordingly, the support conveyor belt 213 will be driven at the same speed as the support conveyor belt 214, and also at the same speed as the primary conveyor belt 206 by use of the conveyor control circuitry illustrated in FIG. 4, which circuitry provides for synchronous operation of the primary and support conveyor drive motors.

In the embodiment shown in FIGS. 5 and 6, the primary conveyor drive motor drives the drive wheel 210 by way of a sprocket and drive chain provided at the side of the conveyor opposite the sprocket 237 shown at the bottom in FIG. 6. The drive wheel 210 has a drive shaft 246 on which a plurality of idler sprockets are mounted in transversely spaced apart relationship to provide support for the full belt width of the primary belt conveyor which preferably is a flat wire belt. The sprockets also ensure proper tracking of the flat wire belt, as is further described above in connection with the FIG. 1 embodiment.

In its return flight the flat wire belt 206 passes from the drive wheel 210 to an idler wheel 250 and then over a take-up wheel 251 which is horizontally adjustable to adjust the belt tension. From the take-up wheel the flat wire belt extends horizontally to an idler wheel 252 at the feed end of the conveyor and then to the tail wheel 209. A plurality of longitudinally spaced-apart, transversely extending support rollers may be provided to support the flat wire belt as it travels from the take-up wheel to the idler wheel. The return path of the flat wire belt may pass beneath the oven and cooler or through the oven and cooler, although usually preferably outside of the temperature controlled region of the oven and/or cooler.

Except as otherwise described and illustrated, the details of the tandem belt conveyor system 200 are the same as described above with respect to the tandem belt conveyor system 10. It also is noted that while a particular feature of the invention may be described with respect to only one of the illustrated embodiments, such feature may be combined with one or more features of the other embodiment, as may be desired and advantageous for any given or particular application.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed:

1. A tandem belt conveyor system comprising an endless primary conveyor belt having a carrier flight for transport of articles, and a return flight; an endless support conveyor belt having a support flight for supporting said carrier flight of said primary conveyor belt, and a return flight, said support conveyor belt including a pair of chains interconnected by transverse cross bars for supporting said primary conveyor belt on said cross bars; a first motor for driving one of said belts; a second motor for driving the other of said belts; and electrical control means for controlling said first and second motors in master-slave relationship to synchronize the speeds of said belts, said electrical control means including means for producing a feedback signal related to the speed of one of said motors, and means for varying the speed of the other of said motors in response to said feedback signal.

2. A tandem belt conveyor system as set forth in claim 1, wherein said primary conveyor belt is a flat wire belt.

3. A tandem belt conveyor system as set forth in claim 1, wherein said electrical control means includes a motor controller.

4. A tandem belt conveyor system as set forth in claim 3, wherein said electrical control means includes first detector means for providing an external reference frequency signal input to said motor controller which is proportional to the speed of said first drive motor, and means for providing a feedback frequency signal input to said motor controller which is proportional to the speed of said second motor; and said motor controller includes means for adjusting the speed of said second motor to maintain a predetermined frequency ratio between said feedback frequency signal and said external reference frequency signal.

5. A tandem belt conveyor system as set forth in claim 4, wherein said second-motor drives said support conveyor belt and said first motor drives said primary conveyor belt.

6. A tandem belt conveyor system as set forth in claim 1, wherein said chains are roller chains, and comprising respective rails coextensive with said support flight on which the rollers of said chains roll.

7. A tandem belt conveyor system as set forth in claim 1, wherein said primary and support conveyor belts are trained over a common idler wheel at the feed end of said belts.

8. A tandem belt conveyor system as set forth in claim 1, wherein said cross bars are of rectangular cross-sectional shape.

9. An article processing system comprising a processing chamber and a tandem belt conveyor mounted with respect to said processing chamber for transporting articles into, through and out of said processing chamber, said tandem belt conveyor including an endless primary conveyor belt having a carrier flight for transport of articles through said processing chamber, and a return flight, said carrier flight of said primary conveyor belt extending through said processing chamber; an endless support conveyor belt having a support flight for supporting said carrier flight of said primary conveyor belt, and a return flight, said support conveyor belt including a pair of roller chains interconnected by transverse cross bars for supporting said primary conveyor belt; respective rails coextensive with said support flight and extending through said processing chamber, the rollers of said chains riding on said rails; and means for synchronously positively driving both said primary and support conveyor belts; and wherein said means for synchronously driving said primary and support conveyor belts includes a first motor for driving one of said belts, a second motor for driving the other of said belts, and electrical control means for controlling said first and second motors in master-slave relationship to synchronize the speeds of said belts, said electrical control means including means for producing a feedback signal related to the speed of one of said motors, and means for varying the speed of the other of said motors in response to said feedback signal.

10. An article processing system as set forth in claim 9, wherein said primary conveyor belt is a flat wire belt.

11. An article processing system as set forth in claim 10, wherein said cross bars are of rectangular cross-sectional slope.

12. A method of transporting article comprising the steps of supporting the articles on a carrier flight of an endless primary conveyor belt, supporting the carrier flight of the endless primary conveyor belt on a support flight of an endless support conveyor belt including a pair of chains interconnected by transverse cross bars that support the primary conveyor belt, using a first motor to drive one of the belts, using a second motor for driving the other of the belts, and using an electrical control device for controlling the first and second motors in master-slave relationship to synchronize the speeds of said belts, said electrical control means including means for producing a feedback signal related to the speed of one of said motors, and means for varying the speed of the other of said motors in response to said feedback signal.

13. A method as set forth in claim 12, comprising the step of guiding the carrier flight of the endless primary conveyor belt through a processing chamber for transporting the articles through the processing chamber.

* * * * *